United States Patent [19]

Sinobad

[11] 3,889,244

[45] June 10, 1975

[54] GRAPHIC DATA DISPLAY SYSTEM WITH MULTIPLE DISPLAY INHIBIT DELAY TIMES

[75] Inventor: Dusan Sinobad, Paris, France

[73] Assignee: Compagnie Industrielle des Telecommunications Cit-Alcatel, France

[22] Filed: Sept. 21, 1973

[21] Appl. No.: 399,477

[30] Foreign Application Priority Data

Sept. 21, 1972 France .............................. 72.33399

[52] U.S. Cl. .............. 340/173 CR; 315/18; 315/30; 328/124; 340/324 A

[51] Int. Cl. ......................... G11c 11/26; G11c 7/06

[58] Field of Search.... 340/173 CR, 324 A; 315/18, 315/30; 328/124

[56] References Cited

UNITED STATES PATENTS 3,588,584 6/1971 Tubinis......................... 340/173 CR

*Primary Examiner*—Stuart N. Hecker

*Attorney, Agent, or Firm*—Craig & Antonelli

[57] ABSTRACT

A graphic data display system for effecting controlled traces on the screen of a cathode ray tube in which data display is inhibited for various delay times in response to detection of changes in selected portions of the binary data signals indicating a change in the required trace including a memory for storing the binary signals and comparators for comparing the corresponding inputs and outputs of greatest weight of said memory to detect said changes.

7 Claims, 1 Drawing Figure

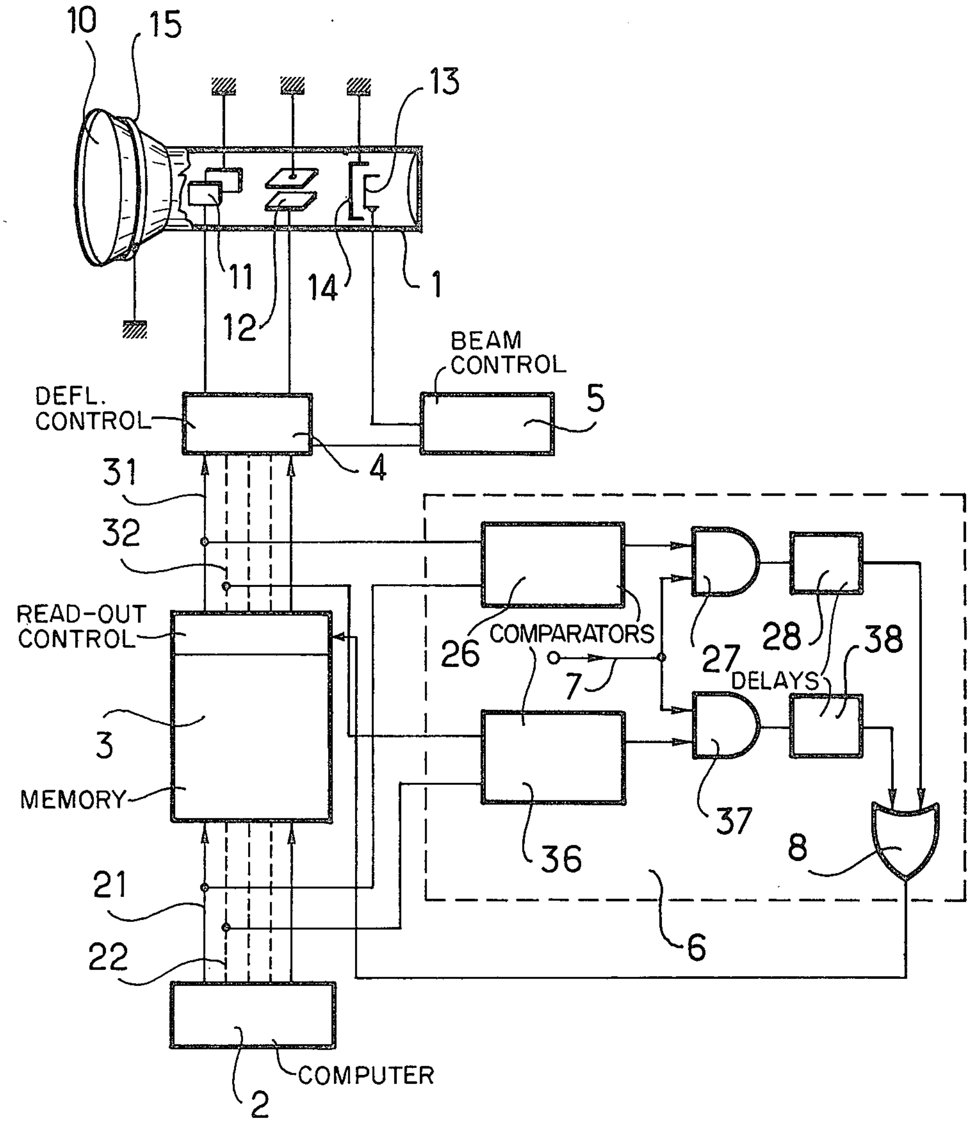
10
15
13
11
12
14
1
BEAM CONTROL
5
DEFL. CONTROL
4
31
32
READ-OUT CONTROL
3
MEMORY
26
COMPARATORS
27
28
38
7
DELAYS
36
37
8
6
21
22
COMPUTER
2

GRAPHIC DATA DISPLAY SYSTEM WITH MULTIPLE DISPLAY INHIBIT DELAY TIMES

The present invention relates to graphic data display assemblies enabling, by the tracing of corresponding curves on the screen of a cathode ray tube, the interpreting of these data items.

In display assemblies, more particularly in assemblies using "random" scanning, that is, in which the scanning of the cathode ray tube screen is not affected in successive lines but the movement of the light spot is controlled by random voltages for the deflection of the electron beam, it is necessary to "position" the spot at the point of origin of the trace on the screen. The positioning of the spot is effected, with the light beam turned off, by applying, on the control grid of the tube, a sufficiently negative voltage for no picture to appear on the screen of the tube, applying to the horizontal and vertical deflection control of the electronic beam potentials representing the coordinates of that origin taken in a system of rectangular axes. The tracing of the curve is then effected by bringing the control grid to a potential such that the light picture appears and by moving the beam on the screen as a function of the data coming from a processing unit connected to the output of a computer.

It is also known that the picture shown on the screen of a non-remanent tube must be renewed frequently at a rate in the order of 40 c/s, to avoid a blinking effect and to obtain the appearance of a continuous display. It therefore appears that the length of the message defined by a sequence of data items which should give rise to the tracing curves on the screen of the cathode ray tube, is therefore limited due to the fact of that cyclic renewal of the picture imposed for the maintaining of its permanent aspect but also due to the fact of the positioning time of the spot at the origin of any curve, that positioning time being lost for displaying.

That positioning time is inevitable, whether the deflection of the electron beam be obtained by electromagnetic means or by electrostatic means.

By way of an example, in an electromagnetic scanning system, a voltage stage having a value representing the position to be imparted to the spot on the screen of the cathode tube is applied to a deflection winding through an amplifier operating as a class A device. When applying that voltage stage to an input of the amplifier, the latter becomes saturated, its output voltage then becoming increased along a straight line having a slight slope, then tends to become stabilized, its output voltage then tending, in a time period depending on the inherent characteristics of the amplifier, to assume a constant value for which the current crossing through the deflection winding is proportional to the value of the input voltage stage applied to the amplifier. The stabilization time period of the amplifier corresponds to the duration of the saturation state and to the duration of the pass from the saturation state to the stabilization state. For a given amplifier, this passing time between these two states is slight and may be considered as a constant; the duration of the stabilization state is variable as a function of the value of the input signal of the amplifier: that time is all the longer as the amplitude of the input signal is greater, that is, as the movement of the beam is greater.

A first method for positioning the spot at the point of origin of the tracing consists in applying the suitable voltages to deflection control and in providing a maximum time corresponding to a maximum movement of the spot on the screen of the cathode ray tube. Indeed, to have a measurement of the true positioning time during which all displaying is prohibited, provisions could be made for detecting the establishing of the stabilization state in comparison with the input and output voltages of the amplifier, in that operation zone, the difference between the input voltages (outside deflection control voltage and reaction voltage) tends towards zero. Nevertheless, the setting off threshold for such an analog comparator is not sufficiently accurate (being disturbed by the noise) to enable a strict detection of that equality; moreover, it is necessary to take into account the fact that, in that operation zone of the amplifier, its output signal tends in an asymptotic way towards a constant value and often has super-oscillations on either side of that constant no longer allowing such a comparison without a danger of error. As that analog comparison is difficult to effect and uncertain due to the fact of the possible super-oscillations affecting the output signal of the amplifier, in practice, in display systems, the displaying of the tracing is blocked during a time equal to the maximum positioning time, this thus being to the detriment of displaying.

The present invention has for its aim the reducing of that time period for the positioning of the spot on the screen of the cathode ray tube in a simple way, while avoiding the above difficulties.

The present invention has for its object a graphic data display system on the screen of a cathode ray tube capable of making the tracing of corresponding curves appear, comprising a memory capable of receiving a sequence of data items in binary form and capable of recording at least one data item relating to a portion of a tracing to be effected, a control element for the electron beam connected to the said memory for controlling it on the basis of the said data item on the outputs and capable of affecting the beam for the displaying of the corresponding trace, characterized in that it comprises, moreover;

at least a digital comparator connected to an input and an output assigned respectively to the binary digits of same weight of the said memory, the aforementioned digital comparators being assigned respectively, to the inputs and outputs of the memory corresponding to the binary digits having the greatest weight of these data items;

at least a setting off circuit each connected to the output of one of the digital comparators and receiving, moreover, a spot positioning control signal at each new data item sent to the output of the said memory;

at least a delay circuit connected to the output of the setting off circuit for its control, from one delay circuit to another, the said delays being different and forming, between them, substantially a geometrical progression having a ratio of 1/2, the greatest delay being defined by the maximum known control time for the spot on the screen and the corresponding delay circuit being connected to the setting off circuit controlled by the digital comparator assigned to the binary input and output digits of the memory having the greatest weight;

and an OR circuit connected to the respective outputs of the said delay circuits sending out, at its output a control signal for the blocking of the displaying during the maximum delay given by that of the delay circuits set off.

Other characteristics and the advantages of the present invention will become apparent from the description of an embodiment given by way of an example and diagrammatically shown in the single figure of the accompanying drawing.

In the FIGURE, the screen 10 of a cathode ray tube 1 is capable of display tracings corresponding to a sequence of data items sent out by a computer 2, these tracings being renewed in successive cycles to obtain an impression of permanence of the picture on the screen. A memory 3 receives these data items from the computer 2 in binary form. The memory 3 may be connected, in a known way, such as disclosed in copending application Ser. No. 361,493 of P. Ligocki, now U.S. Pat. No. 3,854,130, which is assigned to the same assignee as the present application, including various elements not shown such as a read-out control such as a controlled address register, an output register and a sponsoring element for the tracing controlling the tracings on the screen 10 of the cathode ray tube.

The cathode ray tube 1 is connected with an element 4 for controlling the deflection of the electron beam of the tube, connected to the memory 3; that element 4, by means of binary-to-analog converter, not shown, converts the data received successively from the memory 3 into an analog voltage applied to the plates 11 for the horizontal deviation and the plates 12 for the vertical deviation of the electron beam for displaying the corresponding tracing, one of the plates such as 11 and 12 being, for example, as illustrated in the FIGURE, brought to a fixed reference potential.

The cathode ray tube 1 is also connected with high voltage feed means for the cathode 13 of the tube. It has, moreover, been assumed that the control grid 14 as well as the anode 15 of the cathode tube 1 are brought to the fixed reference potential.

The graphic display assembly comprises, moreover, an annex circuit 6 for controlling the positioning of the impact of the spot on the screen of the tube for displaying the tracing.

The positioning control circuit 6 shown in the FIGURE comprises a first comparator 26 having two inputs connected respectively to the input 21 and to the output 31 of the memory 3 and a second comparator 36 having two inputs connected up respectively to the input 22 and to the output 32 of the memory 3, these inputs 21 and 22 and outputs 31 and 32 corresponding to the binary figures having the greatest weights of the data available at the inputs and outputs of the memory 3, the data items considered in that example and available on the inputs and the outputs of the memory 3 being those corresponding respectively to the position of the spot on the tracing displayed on the screen and to the new position which that spot must take up, the two binary digits having the greatest weights considered here in the comparison by the elements 26 and 36 being the most significant of a change in position of the spot. The comparators 26 and 36 will provide the result of the comparison effected. They will send out, for example, a signal having a binary value 1 if the two binary digits applied to their inputs are equal and a signal having a binary value O if these two binary digits at their inputs are different.

The output of the comparator 26 is connected to the input of a setting off circuit 27 controlling a delay circuit 28; the output of the comparator 36 is connected to a setting off circuit 37 controlling a delay circuit 38. The setting off circuits each have a second input on which, at each transfer of data from the input of the memory to its output, is applied a position control signal for the spot of the tube on the screen; the input of that signal is shown at 7.

The delay circuits 28 and 38 will each send out a pulse having a duration equal to the delay which is assigned to them. The outputs of the delay circuits are connected to the inputs of a logic OR circuit 8 on whose output is sent out a signal whose duration is equal to the maximum delay given by the controlled delay circuits 28 and 38. The duration of that signal shows the time required for the positioning of the spot before the displaying of the tracing corresponding to the data to be shown. That signal ensures the blocking of all further displaying during the time determined by the comparators 26 and 36 and the connected delay circuits 28 and 38. It affects, for example the transferring of data from the input to the output of the memory 3.

The delay given by the circuit 28 inserted in the branch of the circuit coming from the comparison of the binary digits having the greatest weight will be chosen equal to the maximum time T for the positioning of the spot on the screen of the cathode tube, that is, to the time corresponding to the maximum movement of the spot on that screen. Indeed, the inequality of the two binary digits existing at 21 and 31 signifies that the movement of the spot, for the representing of the new data existing at the inputs of the memory will be greater than half that maximum time T, a modification of the binary digit having the greatest weight being significant of a movement of more than half the maximum movement of the spot on the screen. On the other hand, an equality of the binary digits existing at 21 and 31 is significant of a movement less than or equal to half of the possible maximum movement of the spot on the screen. The delay given by the circuit 38 of the branch coming from the comparison effected by the comparator 36 will be chosen equal to $T/2+t$, $t$ representing the time, which is substantially constant, given and having a low value before T, for the passing of the deflection control element of the saturation state at the state for which it is stable.

Thus, in operation, a control pulse for the positioning of the spot being given for the advance in the memory of a data item to be represented graphically:

When an equality is detected by the comparator 26, the circuit 27 does not set off the circuit 28 which is suitable for sending out a pulse whose duration is T; on the other hand, an inequality of the binary digits compared at 26 causes the setting off, by the circuit 27, of the circuit 28 which sends out to the OR circuit 8 a pulse whose duration T blocks the displaying of the tracing during that time;

When there is an equality between the binary digits compared in the comparator 36, the circuit 37 is inactive and the $T/2+t$ delay circuit 38 is not controlled, on the other hand, an equality detected between these two digits causes the setting off of the delay circuit 38 which sends out to the OR circuit 8 a pulse having a duration of $T/2+t$;

When there is an inequality detected by both the comparators 26 and 36, the OR circuit 8 sends out a signal having a duration equal to the delay T given by the circuit 28;

When an equality is detected by the two comparators 26 and 36, the OR circuit 8 sends out no display blocking signal; there is no change in position of the spot, or practically none, and the trace is uninterrupted.

It appears, on examining that example of embodiment, that the spot positioning time, before the trace of a curve, may, in many cases which are, in practice, the most frequent, be reduced substantially by half. That device therefore enables the saving of up to 50 percent of time which was previously lost for the positioning of the spot. It must be understood that the comparison effected, in that example, on the two binary digits having the highest weight, may be extended over a greater number of binary digits composing a data item; the corresponding embodiments are then completed in a way identical to the above description, by setting off control circuits and delay circuits whose outputs are connected to the aforementioned logic OR circuit. From one circuit to the next, it should be noted that the delays of the delay circuits given will form among themselves approximately a geometrical progression having a ratio of 1/2, these delays being respectively T, T/2+*t*, T/4+*t*, T/8+*t* . . .

The circuit 6 described hereinabove is applied to the controlling of the positioning of the electron beam; it may also be applied to the controlling of the focusing, the convergence or the correction of the geometrical configuration of the electron beam on the screen.

The present invention has been described with reference to an embodiment given by way of an example; it is evident that without going beyond the scope of this invention, details may be modified and/or certain means may be replaced by other equivalent means.

What I claim is:

1. A graphic data display system for effecting controlled traces on the screen of a cathode ray tube, comprising a memory capable of storing a sequence of data signals in binary form representing at least one data item relating to a portion of a tracing to be effected, control means connected to said memory for controlling the electron beam of the cathode ray tube on the basis of said data signals in binary form received from said memory and capable of affecting the beam for the displaying of the corresponding trace, detection means connected to the input and the output of said memory means for detecting the extent of changes in said data signals, and inhibiting means connected to said memory for inhibiting the application of data signals to said control means for selected delay periods in response to the output of said detection means representing different ranges of change in said data signals.

2. A graphic data display system as defined in claim 1, wherein said detection means includes at least one comparator having a pair of inputs connected to the corresponding input and output of highest weight of said memory and said inhibiting means includes a delay circuit connected to the output of said comparator, the output of said delay circuit being connected in control of the operation of said memory.

3. A graphic display system as defined in claim 2, wherein said detection means includes a second comparator having a pair of inputs connected to the corresponding input and output of second highest weight of said memory and said inhibiting means includes a second delay circuit connected between said second comparator and said memory in control thereof.

4. A graphic display system as defined in claim 3, wherein the two delay circuits provide different delays and form between them a geometrical progression having a ratio of 1:2, the greatest delay being provided by the delay circuit connected to said one comparator.

5. A graphic display system as defined in claim 4, wherein said memory includes a read-out control and said inhibiting means further includes a logic OR circuit receiving the outputs of said delay circuits and having its output connected to control the read-out control of said memory.

6. A graphic display system as defined in claim 5, wherein said inhibiting means further includes first and second gating means responsive to a position signal for connecting the respective outputs of said comparators to said delay circuits.

7. A graphic display system as defined in claim 6, wherein said control means is connected to the deflection system of said cathode ray tube.

* * * * *